July 27, 1965 J. P. CONKLIN 3,197,737

ELECTRONIC MEMORY DEVICE

Filed June 10, 1960 3 Sheets-Sheet 1

INVENTOR.
JOSEPH PATRICK CONKLIN

BY Kenyon & Kenyon

ATTORNEYS

INVENTOR.
JOSEPH PATRICK CONKLIN
BY
Kenyon & Kenyon
ATTORNEYS

United States Patent Office 3,197,737 Patented July 27, 1965

3,197,737

ELECTRONIC MEMORY DEVICE

Joseph Patrick Conklin, Fairfield, Conn., assignor to Pitney-Bowes, Inc., Stamford, Conn., a corporation of Delaware Filed June 10, 1960, Ser. No. 35,367
6 Claims. (Cl. 340—172.5)

This invention relates to a device suitable for storing information in the form of binary coded words and releasing the information so stored at a predetermined time which depends upon the identity of the word stored.

There are many known forms of electronic memory circuits. In many of these circuits, information is stored for a period of time which is not determined at the time the storage occurs. The present invention is directed to an electronic memory circuit in which the storage time is a fixed quantity and is known before the storage takes place.

The nature of the present invention is best described in conjunction with the type of use to which it may be put. Of particular interest is the check-sorting machine described in co-pending application of W. J. Hanson et al. Serial No. 602,191, filed on August 6, 1956, now U.S. Patent 2,977,144, issued March 28, 1961.

In the sorter described in the above-mentioned co-pending application, a series of checks is fed into the machine at relatively high speeds. The sorter contains a plurality of pockets and the checks are routed to a specific one of these pockets by the simple expedient of causing the gate of the desired pocket to open at the precise moment that the check is in the vicinity of the pocket.

The pockets are arranged side by side along the path taken by the moving series of checks. The particular pocket to which a check is directed may be determined, for example, by an appropriate marking on the check which is read by a character reader of the type described in co-pending application Serial No. 20,948. In such a system, the particular pocket to which a check is directed is determined before the check begins its travel past the group of pockets.

A simple method of ensuring that the gate of the pocket to which a particular check is directed will open at the appropriate time, to wit, at the time when the check is in the immediate vicinity of the pocket, is to store the information relating to the pocket designation for a period of time substantially equal to the time required for the check to reach the desired pocket. In this manner, the information is released to the pocket at the precise time and the gate opens to allow the check to enter the pocket.

If the pocket is one of those near the end of the path of travel, the time for which the information must be stored is greater than if the pocket is one of the first ones in the group. In other words, the period of time the information is stored for any given pocket is proportional to the time required for the check to reach the pocket from the character reader. Thus, once the pocket is determined for a particular check, this information travels along a path which parallels that of the check itself.

The present invention provides a storage facility which may be used to accomplish the aforementioned result. An important advantage of the present invention is that it minimizes the number of circuit components required to accomplish the desired storage operation.

Accordingly, it is an object of the present invention to provide a device which receives and stores information for a predetermined period of time.

It is another object of this invention to provide a storage device in which the storage times of the respective pieces of information to be stored are dependent on identity of the pieces of information.

It is a further object of this invention to provide an electronic storage device which operates with a minimum of component parts.

Briefly stated, the present invention comprises an array of storage elements adapted to store a group of words in binary coded form. The storage elements are connected in an array formed of rows and columns, the number of elements per row, i.e., the number of columns corresponding to the number of bits in the binary code, and the number of rows corresponding to the number of words in the group. The binary coded words are introduced in a row at one end of the array and transferred stepwise through the array. Analysis means are employed to analyze the permutational condition of each row in the array in accordance with an analysis matrix which is composed of a columnar arrangement of the group of words. When the word in a row matches the correspondingly positioned word in the analysis matrix, a read-out is effected and storage of the word is terminated.

The analysis matrix is arranged so that at least one binary bit in one column of the last word in the matrix is repeated in the same column of at least the next preceding word thereby forming at least one repetitive series. When such repetition occurs, storage elements in the array corresponding to the repetitive series of bits are omitted. Reset means is provided and keyed to the storage element corresponding to the bit in the analysis matrix which next precedes the repetitive series. When the storage element is in a condition of opposite sense to that of the repetitive series, the reset means is operative to eliminate from the array the word in the row containing the keying storage element.

The present invention will be more readily understood when described in conjunction with the following drawings in which:

FIG. 1 depicts the code designations of decimal digits 1 through 10 in a binary four-bit code wherein the first bit represents the digit 8, the second bit represents the digit 4, the third bit represents the digit 2 and the fourth bit represents the digit 1;

FIG. 6 depicts an electronically operated embodiment of the present invention.

Figure 1:
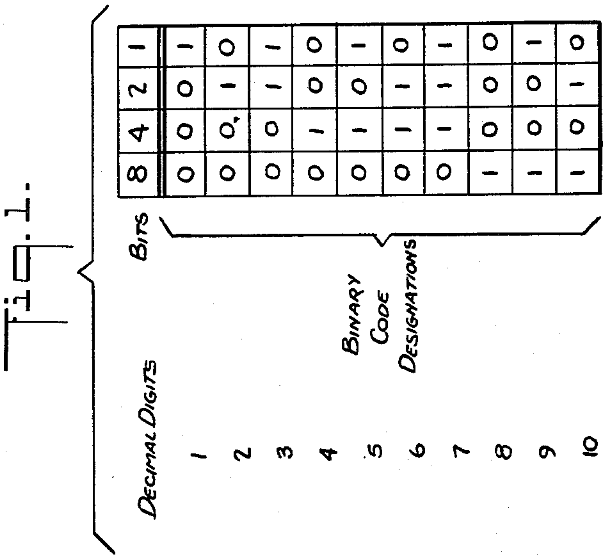

With reference now to the drawings, FIG. 1 depicts the coded representation of decimal digits 1 through 10 in an 8, 4, 2, 1 binary code (see Arithmatic Operations in Digital Computers, by R. K. Richards, D. Van Nostrand & Company, Inc., 6th Printing, page 177, et seq.). In accordance with terminology conventionally used in the computer field, the coded designation of decimal digit 9 as shown in FIG. 1 is called a "word." Each of the four numerals representing decimal digit 9, to wit, "1001," are called bits.

Figure 2:
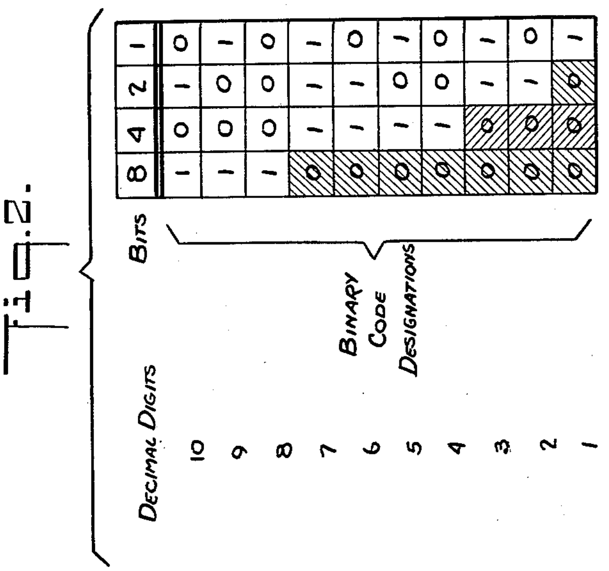
FIG. 2 depicts a matrix composed of the decimal digits 1 through 10 coded as shown in FIG. 1.

FIG. 2 depicts the coded representations of decimal digits 1 through 10 in a matrix which assumes importance for reasons to be discussed below.

Figure 3:
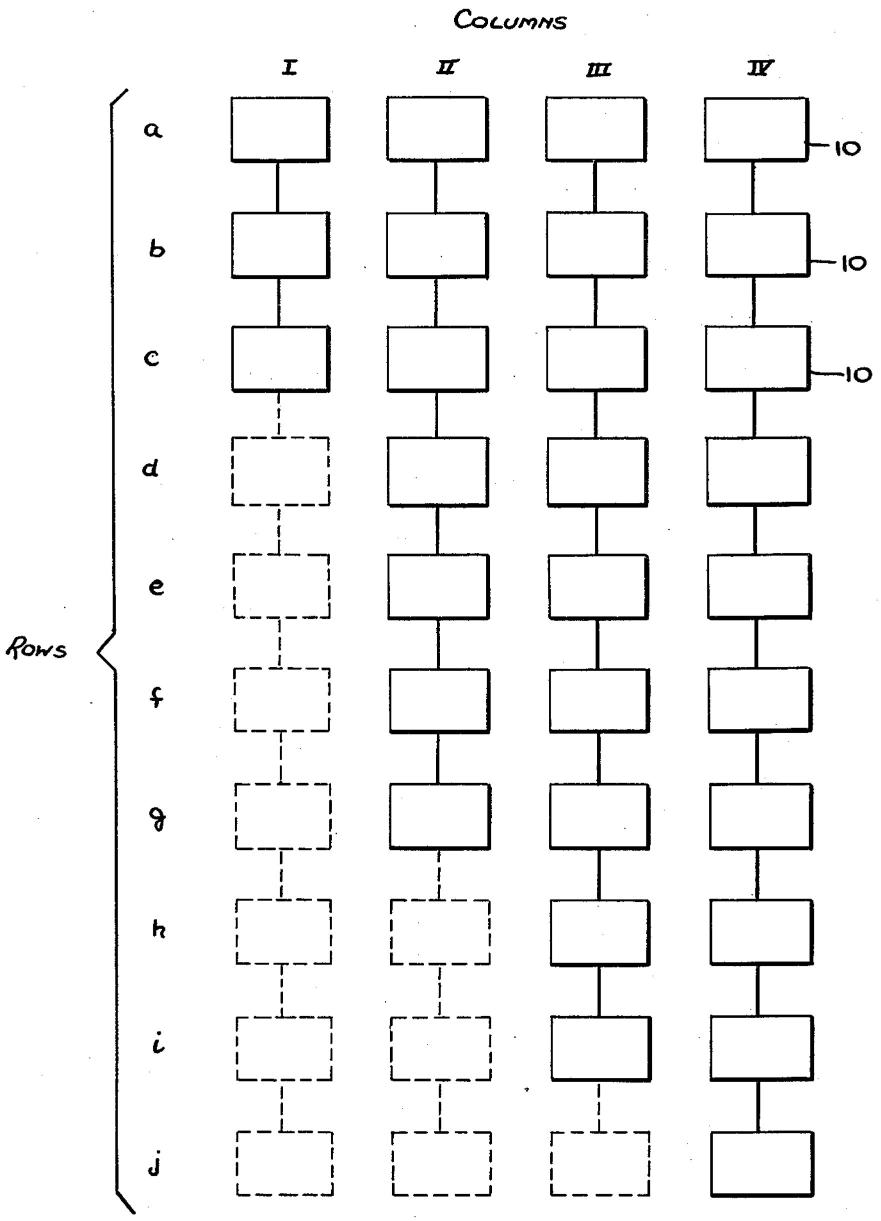
FIG. 3 depicts an array of storage elements suitable for use in the present invention.
Figure 8:
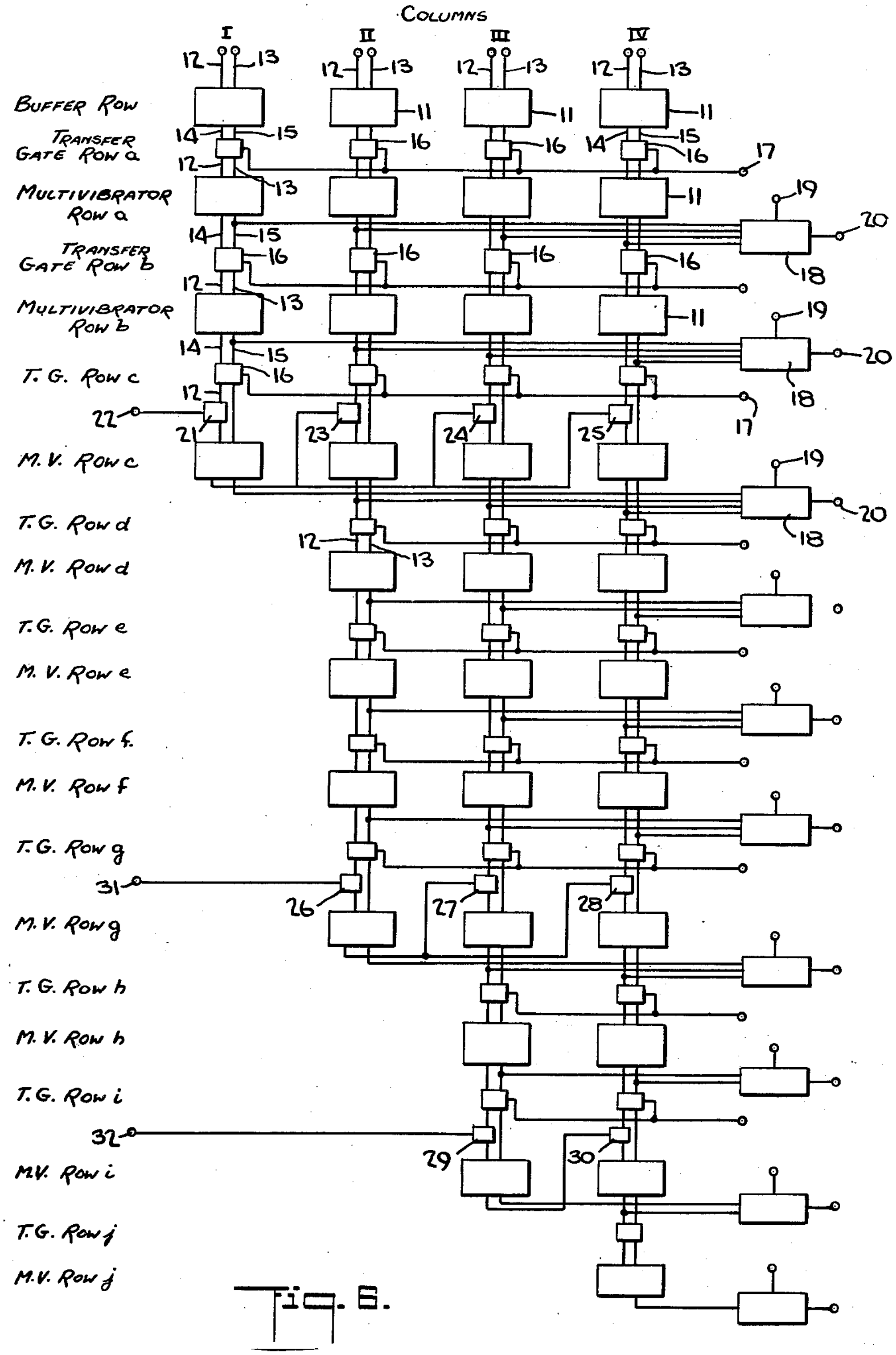

FIG. 3 depicts a group of binary storage elements 10 in an array of four Columns, numbered I through IV, each Column representing one of the bits of the binary code used in FIG. 2. Binary storage elements 10 are also arranged in Rows *a* through *j*, each row representing one of the group of decimal digits to be stored, to wit, ten rows corresponding to decimal digits 1 through 10 inclusive.

Figure 4:
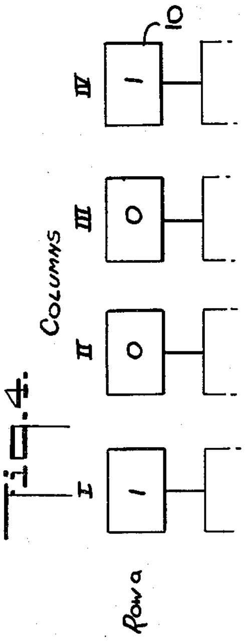
FIG. 4 depicts Row *a* of the array of FIG. 3 in a certain permutational condition.

In essence, FIG. 3 depicts a simplified version of the present invention. Assume that the decimal digit 9 is to be stored in the array depicted in FIG. 3. The first step is to introduce decimal digit 9, in binary coded form, into Row *a* of the array of FIG. 3. Such an operation requires that each binary storage element in Row *a* be placed in a condition which represents either a "0" or a "1". Thus, FIG. 4 depicts the storage elements 10 of Row *a*, each of which is set so that the permutational condition of the Row represents decimal digit 9.

The next step in the operation of the array of FIG. 3 is a read-out step. In this step, the permutational condition of each of the Rows *a* through *j* is analyzed in a manner discussed in detail below.

At this point, reference is directed to FIG. 2 which depicts the binary coded representation of decimal digits 1 through 10 in a particular matrix. Read-out of each of Rows *a* through *j* of the array of FIG. 3 is made in accordance with the matrix shown in FIG. 2. That is to say, read-out of Row *a* is conducted solely to determine if the permutational condition of storage elements 10 in Row *a* corresponds to the series depicted in the first row of the matrix depicted in FIG. 2. Thus, Row *a* is analyzed to determine whether the storage element in Column I is in the "1" condition, the storage element in Column II is in the "0" condition, the storage element in Column III is in the "1" condition and the storage element in Column IV is in the "0" condition, such situation resulting in a permutational condition of Row *a* of "1010". Of course, this permutational condition would prevail if the coded designation of the number 10 was present in Row *a* of the array of FIG. 3.

As stated above, read-out of Rows *a* through *j* is conducted in accordance with the matrix of FIG. 2. Since the actual permutational condition of Row *a* is representative of decimal digit 9, as shown in FIG. 4 and therefore does not correspond to the permutational condition of the first row of the matrix in FIG. 2, no read-out results.

The next step in the operation of the array of FIG. 3 is the transfer of each of the bits in Row *a* to the next succeeding binary storage element in the same column. Assume that no additional word is introduced into Row *a*.

Figure 5:
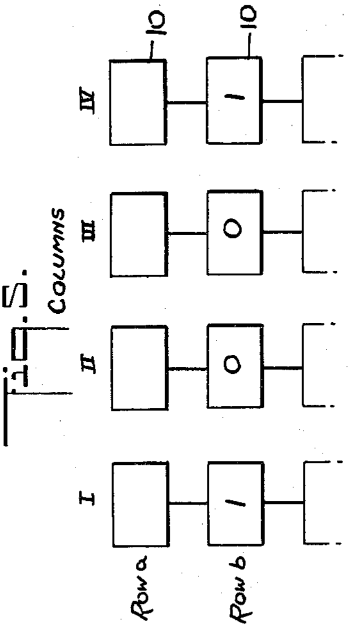
FIG. 5 depicts Rows *a* and *b* of the array of FIG. 3, Row *b* being in a certain permutational condition.

FIG. 5 depicts Rows *a* and *b* of the array shown in FIG. 3 following this transfer step. As shown, the storage elements of Row *b* are in a permutational condition representative of the binary designation for decimal digit 9.

At this point in the operation, the read-out step is repeated. In this instance, the permutational condition of Row *b* corresponds exactly with the second row of the matrix of FIG. 2. Accordingly, a read-out signal indicative of the presence of number 9 in Row *b* is produced. Accordingly, the storage of decimal digit 9 is terminated.

The description of the operation of the array shown in FIG. 3 up to this point has included the steps of introducing a binary coded designation of the decimal digit 9 into the array of FIG. 3, storing the decimal digit 9 therein for a predetermined period of time, to wit, the time required for the information to be transferred from Row *a* to Row *b*, and finally releasing the decimal digit 9 from storage.

Following the read-out step in which it was recognized that the binary coded representation of decimal digit 9 was contained in Row *b*, a transfer similar to the one which moved decimal digit 9 from Row *a* to Row *b* is effected. Such a transfer step would cause the permutational condition of Row *c* to become identical to that shown for Row *b* in FIG. 5.

The same sequence of steps is continually repeated in the operation of the device of this invention. That is to say, the first step is the introduction of a binary coded number into Row *a* of the array of FIG. 3, the second step is a read-out of all of the rows and the third step in the sequence is the transfer of the permutational condition of each row to the next succeeding row.

The period of time for which any word is stored depends on the position of its read-out row in the matrix. Thus, referring to FIG. 2, it is seen that decimal digit 9 will be stored for a period of time necessary to transfer it from Row *a* to Row *b*, decimal digit 8 will be stored for the period of time necessary to transfer it from Row *a* to Row *c*, etc.

Referring back to the example in which the binary designation of the decimal digit 9 is being carried through the array of FIG. 3, assume that decimal digit 9 is present in Row *c*. Clearly, the next read-out step will not produce a signal since the permutational condition required by Row *c* is the binary code designation for decimal digit 8 and this is not satisfied by the presence of decimal digit 9.

At this point, an important feature of the present invention will be described. Referring to FIG. 2, it is seen that the vertical column in the matrix representing binary bit "8" starts with three "1's" in sequence. That is to say, the decimal digits 8, 9 and 10 each have a "1" as the first bit in their binary coded form. On the other hand, the binary coded designation of decimal digits 1 through 7 each have a "0" as the first bit in the series. Since the matrix shown in FIG. 2 represents the read-out pattern employed in the operation of the array of FIG. 3, it follows that if the storage element in Column I, Row *c* of the array of FIG. 3 is in the "1" condition, the decimal digit contained in Row *c* must be either 8, 9 or 10. To put it another way, decimal digits 8, 9 and 10 may be distinguished from decimal digits 1 through 7 merely by examining the first binary bit of the binary coded designation. If the first bit is a "1," the decimal digit may be 8, 9 or 10, and if the first bit is a "0," the digit must be in the group of 1 through 7.

The foregoing is the basis for a second truism. Since each of decimal digits 1 through 7 has a "0" as the first bit in the series of four bits used to identify the decimal digit, reference solely to the first bit cannot aid in distinguishing any one of the decimal digits in the group 1 through 7 from any other in this group. Accordingly, there is no need to provide a storage element for the first bit of each of decimal digits 1 through 7 since recognition of any of the digits in this group during the read-out step does not require identification of the first bit. Thus, the array shown in FIG. 3 does not contain storage elements in Rows *d* through *j* in Column I.

However, elimination of the aforementioned storage elements from the array of FIG. 3 necessitates some compensation. Otherwise, the binary coded designation of decimal digit 9 would eventually be identified as the binary coded designation of decimal digit 1 since as can be seen in FIG. 2, the coded designations of decimal digits 1 and 9 are identical except for the first bit in the series. If there were no compensation, the introduction of the binary coded designation for decimal digit 9 would read-out both as decimal digit 9 and also eventually as decimal digit 1.

To avoid the foregoing difficulty, another step is introduced into the operation of the array of FIG. 3. This step is termed the reset step. In the context of the above discussion, this reset step would result in the elimination from the array of the coded designation for decimal digit 9 after a read-out of decimal digit 9 has been effected. Such elimination would prevent the last three binary bits representative of decimal digit 9 from being erroneously read-out as decimal digit 1.

The manner in which the reset step is accomplished is as follows:

A reset mechanism, to be described in detail below, is keyed to the storage element in Column I, Row *c* of the array of FIG. 3. As seen from reference to FIG. 2, this storage element is the last one in Column I which is required to be in condition "1" in order for a read-out to occur. Thus, if the storage element in Column I, Row *c* is in condition "1," then it follows that the coded designation contained in Row *c* must have been read-out either as decimal digits 8, 9 or 10. On the other hand, if this storage element is in condition "0," then the binary coded designation contained in Row *c* may be any one of the decimal digits in the group 1 through 7.

Accordingly, if this storage element is found to be in condition "1," there is no reason to continue transfer of this coded designation down through the array of FIG. 3 since a read-out has already been effected by this coded designation. Thus, if the storage element in Column I, Row *c* is found to be in condition "1," all four of the storage elements in Row *c* are reset to "0" condition. As may be seen from a study of the matrix of FIG. 2, transfer down through the array of a designation in which the final three bits are "0's" will not result in a read-out in any of Rows *d* through *j*.

The reasoning set forth above applies equally well to the last three storage elements of Column II of the array of FIG. 3. Thus, these storage elements may be eliminated since, as shown in FIG. 2, neither the first nor the second binary bits are necessary to distinguish between decimal digits 1, 2 and 3. The reset step is here keyed to the storage element in Row *g*, Column II.

Finally, the last storage element in Column III may be eliminated on a similar basis as that above. That is to say, that if it is determined that the storage element in Column III, Row *i* is found to be in the "1" condition, then clearly the decimal digit contained therein cannot be decimal digit 1. In such instance, the reset step will eliminate the coded designation from the storage element in Row *i*. On the other hand, if the condition of the storage element in Column III, Row *i* is found to be in the "0" condition, then it follows that the decimal digit contained in Row *i* must be decimal digit 1. Accordingly, there is no need for a storage element in Column III, Row *j* and this storage element is also eliminated.

The storage elements which may be omitted from the array are shown in dotted outline form in FIG. 3. These storage elements correspond to the binary bits which are cross-hatched in the matrix of FIG. 2.

From the foregoing explanation, it can be seen that the device of this invention affords an economy in that less than the theoretical number of storage elements is necessary to provide storage for a given number of binary coded words.

An important factor in the present invention is the order in which the read-outs are made, such order being represented by the matrix shown in FIG. 2. The order in which the read-outs are made is important since judicious choice can maximize the number of elements which can be omitted.

Additionally, the reset feature is essential since it eliminates improper read-outs which would otherwise occur.

It is to be understood that the foregoing explanation of the present invention is intended only as an illustrative example, the use of 10 decimal digits and the use of a four-bit binary code being mere matters of choice. The principles upon which the present invention are based place no limitation either on the binary code which may be used or on the number of words to be stored.

A practical embodiment of the present invention is depicted in FIG. 6. Depicted in this drawing is an array of storage elements 11 arranged in four columns and 11 rows. The four columns are denoted by the headings Column I, Column II, Column III and Column IV. Except for the first row of storage elements, labeled Buffer Row, the array corresponds exactly to the one shown in FIG. 3. This array is designed and operated in accordance with the analysis matrix shown in FIG. 2.

It is to be appreciated that the choice of design of the array is not inherently limited, the particular array shown in FIG. 6 being used since it simplifies the description which follows, the analysis matrix of FIG. 2 having already been described above.

Each of storage elements 11 is composed of a bistable multivibrator. (See Transistor Handbook, Prentice Hall, Inc., 1956, pages 331 to 334.) As is well known, a bistable multivibrator can be in either one of two electronically different conditions, one of which is used to represent the binary code bit "0" and the other used to represent binary code bit "1."

The electronic condition of a bistable multivibrator is generally manifested by the potential level of its output terminals. The condition of a bistable multivibrator may be affected by pulsing the multivibrator at one of two inputs, a pulse at one input producing the "0" condition and a pulse at the other producing a "1" condition. Connected to each of the bistable multivibrators in the array of FIG. 6 are pairs of input leads 12 and 13 and pairs of output leads 14 and 15. Input lead 12 and output lead 14 are associated with the "0" condition and are hereinafter termed "0" leads, and input lead 13 and output lead 15 are associated with the "1" condition and are hereinafter termed "1" leads. Thus, for example, a pulse received through input lead 12 will place the multivibrator in the "0" condition and this will result in a manifestation of the "0" condition at the output lead 14.

Prior to the operation of the array, a clearing pulse is transmitted to each of the multivibrators 11 in the Buffer Row via leads 12. This pulse places each of the Buffer Row multivibrators in the "0" condition. The four-bit binary coded designation for a word is then introduced into Buffer Row multivibrators 11 via leads 13. In accordance with binary coding practice, the bit "0" is represented by the absence of a pulse, whereas the bit "1" is represented by the presence of a pulse. Thus, for example, if the word to be introduced is decimal digit 9, shown in binary code form in FIG. 1, then a pulse will be conducted only through the leads 13 connected to the multivibrators in Columns I and IV. These pulses will change the condition of the storage elements in Columns I and IV from the "0" condition to the "1" condition. Accordingly, the permutational condition of the Buffer Row would be "1001."

Connected to the output leads of each of the multivibrators 11 in the Buffer Row are transfer gates 16 forming Transfer Gate Row *a* (see Transistor Handbook, pages 356 to 360). The transfer gate assumes the condition of the multivibrator to which it is connected.

In the embodiment depicted in FIG. 6, the Buffer Row is employed merely to permit the insertion of data during the full period of time between transfer steps. As such, it acts as a storage section for one cycle of operation, a cycle being the sum total of steps between sucessive transfer steps and including one transfer step. The embodiment would work equally well as far as the principles of the invention are concerned if the Buffer Row were omitted.

As shown in FIG. 6, each of transfer gates 16 in Transfer Gate Row *a* is connected to terminal 17. Each of transfer gates 16 in Transfer Gate Row *a* are also connected to the bistable multivibrators 11 which form Multivibrator Row *a* through pairs of input leads 12 and 13.

The respective conditions of transfer gates 16 in Transfer Gate Row *a* may be transmitted to multivibrators 11 in Multivibrator Row *a* by appropriately pulsing the transfer gates 16 at terminal 17. If the transfer gate is in a "0" condition, it will transmit this information through input lead 12, and conversely, if it is in the "1" condition, it will transmit this information through the input lead 13. In this manner, the condition of each of the multivibrators in the Buffer Row is transferred to the multivibrators in the same column in Multivibrator Row *a*.

As shown in FIG. 6, one of the two output leads 14 and 15 of each of the multivibrators forming Multivibrator Row *a* is connected to "and" gate 18. As stated above, the binary condition of a multivibrator is determined by the potential level at its output terminals. The "and" gate 18 is connected to that terminal of each of the multivibrators which corresponds to the permutational condition of the first row of analysis matrix of FIG. 2. The analysis matrix calls for the permutational condition "1010" in the first row corresponding to decimal digit 10. Thus, "and" gate 18 is connected to the "1" output lead of the storage element of Column I, the "0" output lead of the storage element in Column II, the "1" output lead of the storage element of Column III and the "0" output lead of the storage element in Column IV. If the binary code designation of decimal digit 10 were contained in Multivibrator Row *a*, then the same potential level would be present at each of the leads of the multivibrators which are connected to "and" gate 18.

"And" gate 18 is also connected to terminal 19. "And" gate 18 has been designed in the conventional manner so that a pulse will appear at its output terminal 20 only if each of the output leads to which "and" gate 18 is connected are at the same potential and in addition, terminal 19 is at the potential level of the aforesaid output leads.

Accordingly, read-out is accomplished by pulsing "and" gate 18 through terminal 19. If the permutational condition of the multivibrators 11 in Row *a* matches that of the matrix shown in FIG. 2, then a signal will appear at output terminal 20.

In the operation of the device shown in FIG. 6, provision is made for introducing a new word into the device between successive steps of transferring words from row to row. To this end, at the same time that the transfer step is conducted, consisting of pulsing the transfer gates 16 through terminal 17, each of multivibrators 11 in the Buffer Row is pulsed through leads 12, thereby converting each of these multivibrators to the "0" condition and making them ready for introduction of a new word.

The multivibrators 11 of the Buffer Row, or multivibrators 11 of Row *a* if no Buffer Row is used, are converted to the "0" condition at the beginning of each cycle to prevent the repetition of the previous word stored in a situation in which no new word is introduced. In other words, in a situation in which a certain word is introduced in the Buffer Row, and no new word is introduced therein for the next several succeeding cycles, the word previously introduced in the Buffer Row will remain in the Buffer Row and will be transferred to Row *a* on each cycle until a new word is introduced into the Buffer Row. Thus, clearing of the first row eliminates introduction into the array of words which are not representative of information actually introduced into the device.

The operation of the device shown in FIG. 6 has been described to show how a word is introduced therein, how a word is transferred from one storage element row to the next and also how read-out is accomplished. It remains to disclose the method by which a word is eliminated from the array by means of the reset step.

As discussed above, reset means is keyed to the storage element corresponding to the first binary bit of the decimal digit 8, as that number is shown in FIG. 2. With reference to FIG. 6, this storage element is represented by multivibrator 11 in Multivibrator Row *c*, Column I An "or" gate 21 is connected in input lead 12 between the transfer gate 16 in Column I, Row *c* and the multivibrator 11 in Column I, Row *c*. It is recalled that lead 12 is associated with the "0" condition. "Or" gate 21 also has input terminal 22. Thus, a signal appearing either at terminal 22 or in the "0" output lead of transfer gate 16 will cause this multivibrator 11 to change from the "1" condition to the "0" condition, if it was originally in the "1" condition. If it was in the "0" condition prior to receipt of such pulses, then there will be no change in the condition of this multivibrator.

As shown in FIG. 6, the "0" output lead of the multivibrator in Multivibrator Row *c*, Column I, is connected to the "0" input leads of the other three multivibrators 11 in the same row through "or" gates 23, 24, and 25 respectively. Thus, if multivibrator 11 in Multivibrator Row *c*, Column I, is in the "1" condition, a pulse introduced into "or" gate 21 through terminal 22 will cause this multivibrator to change from the "1" condition to the "0" condition. This change of condition will result in the production of a pulse at the "0" output lead of this multivibrator 11, and this pulse will be fed to the other multivibrators 11 in Multivibrator Row *c* through "or" gates 23, 24 and 25, respectively. Accordingly, the pulse emitted at the "0" output lead of multivibrator 11 in Column I will cause each of the other three multivibrators of Multivibrator Row *c* to assume the "0" condition, if they were in the "1" condition prior to receipt of this pulse.

Thus, the arrangement of "or" gates 21, 23, 24 and 25 shown in FIG. 6 causes resetting of each of the storage elements in Multivibrator Row *c* to the "0" condition if the storage element in Column I is in the "1" condition. In other words, the reset step is keyed to the presence of the "1" condition in the multivibrator in Row *c*, Column I. The presence of such "1" condition would mean that the decimal digit contained in Row *c* is either 8, 9 or 10 and accordingly would have been read-out in one of Multivibrator Rows *a*, *b*, or *c*. Accordingly, there is no need to carry this decimal digit through the rest of the rows in the array. More important, is the fact that resetting the multivibrators to "0" condition precludes the eventuality of the decimal digit contained therein being read-out erroneously in one of the succeeding rows, and thereby makes possible the use of less than the theoretical number of storage elements.

On the other hand, if the multivibrator in Column I, Row *c* were to be in the "0" condition, then a pulse at terminal 22 would produce no change in the condition of this multivibrator, and accordingly, no pulse would appear at the "0" output lead. In such instance, there would be no pulse transmitted to "or" gates 23, 24 and 25, and therefore, the multivibrators in Columns II, III and IV would be unaffected, and the decimal digit contained in Row *c* would pass on to the next succeeding row.

The balance of the circuitry shown in FIG. 6 is repetitious of that described above. Reset means comprising the "or" gates 26, 27 and 28 is used in Multivibrator Row *g*, and reset means comprising "or" gates 29 and 30 is used in Multivibrator Row *i*. The use of reset means in these particular rows is in accordance with the principles described above, to wit, the use of reset means keyed to the storage element in the columns preceding the repetitive series of binary bits.

In summation, what is shown in FIG. 6 is an array of storage elements which may be used in accordance with the principles of the present invention. Transfer gates are employed to transfer binary coded words from one storage element to the next one in the same column. "And" gates are employed to read-out each of the storage element rows of the array. A series of "or" gates is employed to reset a particular row of storage elements to eliminate the eventuality of an erroneous read-out due to the elimination of storage elements.

It is to be appreciated that the read-out step, which causes termination of the storage of a word, represents an operation which differs substantially from the reset step, which eliminates a word from the array. After the read-out step, the word continues to be transferred from row to row, even though storage has been terminated. On the other hand, the reset step eliminates the word from the array so that it no longer can be transferred from row to row.

With reference to the use of a device similar to that shown in FIG. 6, in conjunction with the sorting apparatus described in copending application, Serial No. 20,948, all that is additionally necessary is a monostable multivibrator (see Transistor Handbook, pp. 325 to 328) to coordinate the transfer of words through the array with the movement of documents through the sorting machine.

Thus, for example, a timing pulse from a timing device within the sorting apparatus, is fed to a monostable multivibrator, not shown in FIG. 6. The time between successive timing pulses constitutes one cycle. The timing pulse triggers the monostable multivibrator. The output of the monostable multivibrator is connected to terminals 17 so that the leading edge of its output pulse causes the transfer of words from row to row of the array of FIG. 6. Thus, the time spacing between successive transfer steps is equal to the time spacing between successive timing pulses.

The output of the monostable multivibrator is also connected to leads 13 of the Buffer Row of multivibrators, thereby clearing the Buffer Row and placing them in the "0" condition.

The pulse from the monostable multivibrator is introduced into terminals 19 of "and" gates 18 and the read-out step is thereby commenced. The width of the pulse can be fixed to endure, for example, for approximately 15 milliseconds. Thus, read-out takes place during the entire duration of this pulse, namely, 15 milliseconds. The read-out pulse produced at output terminals 20 of "and" gates 18 is connected in a manner which actuates the gates on the corresponding pockets of the sorting apparatus.

Terminals 22, 31 and 32 of "or" gates 21, 26 and 29 respectively, are connected to the output of the monostable multivibrator in such fashion that the trailing edge of the output pulse is used to convert the storage elements connected to the "or" gates to the "0" condition thereby eliminating words from certain rows as described above.

A new word may be introduced into the Buffer Row of multivibrators at any time after the Buffer Row is cleared, but before the next succeeding transfer step. For example, the time of spacing of successive transfer steps may be set at 80 milliseconds by adjusting the timing device which provides the timing pulse. The timing pulses are synchronized with the movement of documents through the sorting machine in a manner well known to those skilled in the art so that the identification occurs preferably within the first 20 milliseconds of the 80 millisecond cycle (see, for example, U.S. Patent No. 2,936,170 issued to Herrick et al. on May 10, 1960). In such a situation, introduction of the new word would thus occur after the first 20 milliseconds of the 80 millisecond cycle.

Thus, by the use of a single timing signal, which is fed to a monostable multivibrator, the device shown in FIG. 6 is operated in the proper sequence. The time spacing between successive timing pulses is chosen so that the length of time required for a particular document to move to the appropriate pocket may be reflected in the time necessary for the binary coded designation associated with the document to reach the row of storage elements where it will produce a read-out signal which in turn will cause the gate of the appropriate pocket to open.

It is to be appreciated that the examples described above in conjunction with the drawings are intended merely as illustrative of the present invention. Variations may be made therein by one skilled in the art without departing from the spirit and scope of this invention.

I claim:

1. A device which stores a group of $m$ words, introduced therein in a binary code of $n$ bits, for periods of time which vary in accordance with the identity of the word being stored comprising a plurality of binary storage elements arranged in an array of $n$ columns formed of $m$ rows, means for introducing in an ordered manner a different one of the $n$ bits of a word of said group into the first storage element of each of said $n$ columns whereby the word is represented by the permutational condition of the first row of said $m$ rows of storage elements, means for transferring the bits from one storage element to the next succeeding storage element in a column in stepwise fashion whereby the word represented by the bits is transferred from row to row, an analysis matrix consisting of a columnar arrangement of the said group of words in binary coded form, the said array of storage elements being related to the said analysis matrix in that each of the said storage elements in the array is represented by a binary bit which is correspondingly positioned in the matrix, read-out means to analyze the permutational condition of the storage elements in each of the $m$ rows, each row being analyzed for a different one of said group of words in accordance with said analysis matrix whereby a read-out is effected if the word contained in a row of said array matches the correspondingly positioned word in the analysis matrix and storage is thereby terminated, the said group of words being arranged in said analysis matrix so that at least one of the bits of the last word in the matrix is repeated in at least the preceding word in the same column thereby forming at least one repetitive series, reset means keyed to the storage element which corresponds to the bit in the matrix which precedes the repetitive series, said reset means being rendered operative by the presence in the storage element of a bit of opposite sense to that of the repetitive series and acting to eliminate from said array the word in the row which contains the keying storage element, the storage elements corresponding to the bits in the said repetitive series being omitted from said array whereby the total number of storage elements in said array equals the product of $m$ times $n$ minus the number of bits in said repetitive series.

2. A device which temporarily stores information in the form of a group of words in binary coded form comprising a plurality of binary storage elements arranged in an array of columns and rows, the number of said columns being equal to the number of words in said group and the number of rows being equal to the number of bits in the binary code employed, means for introducing the bits of a binary coded word of said group into the first storage element of each of said columns whereby the word is represented by the permutational condition of the said first row, means for transferring the word represented by the bits from one row to the next succeeding row in stepwise fashion, an analysis matrix consisting of a columnar arrangement for the said group of words in binary coded form, read-out means to determine if the permutational condition in each of the said rows corresponds to a different one of said group of words in accordance with said analysis matrix whereby a read-out is effected if a word contained in a row matches the word correspondingly positioned in the said analysis matrix and storage is thereby terminated, said analysis matrix being arranged so that at least one of the bits of the last word in the matrix is repeated in at least the preceding word in the same column thereby forming at least one repetitive series, reset means responsive to the condition of a keying storage element, said keying storage element corresponding to the bit in the matrix which precedes the repetitive series, said reset means being operative to convert each of the storage elements in the row containing said keying storage element to a sense which is the same as that of said repetitive series if the said keying storage element is in a condition of opposite sense to that of the said repetitive series if the said keying storage element is in a condition of opposite sense to that of the said repetitive series the storage elements corresponding to the bits in the said repetitive series being omitted from said array whereby the total number of storage elements in said array equals the product of the number of words in said group times the number of bits in the binary code employed minus the number of bits in said repetitive series.

3. A device which stores a group of $m$ words, introduced therein in a binary code of $n$ bits, for different periods of time which vary in accordance with the identity of the word being stored comprising a plurality of binary storage elements in the form of bistable multivibrators arranged in an array of $n$ columns formed of $m$ rows, means for introducing in an ordered manner a different one of the $n$ bits of a word of said group into the first storage element of each of said $n$ columns whereby the word is represented by the permutational condition of the first row of said $m$ rows of storage elements, a transfer gate responsive to the condition of each of the storage elements in the array other than those in the last row, said transfer gates being operative to transfer the bits from one storage element to the next succeeding storage element in a column whereby the word represented by the bits is transferred from row to row, an analysis matrix consisting of a columnar arrangement of the said group of words in binary coded form, the said array of storage elements being related to the said analysis matrix in that each of the said storage elements in the array is represented by a binary bit which is correspondingly positioned in the matrix, read-out means in the form of "and" gates appropriately connected to the storage element in each of the rows in the said array whereby the permutational condition of the storage elements in each of the rows is analyzed for a different one of the said group of words in accordance with the said analysis matrix whereby a read-out is effected if the word contained in a row of said array matches the correspondingly positioned word in the analysis matrix and storage is thereby terminated, the said group of words being arranged in said analysis matrix so that at least one of the bits of the last word in the matrix is repeated in at least the preceding word in the same column thereby forming at least one repetitive series, reset means responsive to the condition of a keying storage element, said keying storage element being the one in the said array which corresponds to the bit in the matrix which precedes the said repetitive series, said reset means being operative to convert all of the storage elements in the row containing the said keying storage element if the said key storage element is in a condition opposite to that of said repetitive series, the storage elements corresponding to the bits in the said repetitive seies being omitted from the said array whereby the total number of storage elements in the said array equals the product of $m$ times the $n$, minus the number of bits in the said repetitive series.

4. A device which stores a group of $m$ words, introduced therein in a binary code of $n$ bits, for periods of time which vary in accordance with the identity of the word being stored comprising a plurality of binary storage elements arranged in an array of $n$ columns formed of $m$ rows, means for introducing in an ordered manner a different one of the $n$ bits of a word of said group into the first storage element of each of said $n$ columns whereby the word is represented by the permutational condition of the first row of said $m$ rows of storage elements, means responsive to a first timing signal for transferring the bits from one storage element to the next succeeding storage element in a column in stepwise fashion whereby the word represented by the bits is transferred from row to row, an analysis matrix which consists of a columnar arrangement of the said group of words in binary coded form, the said array of storage elements being related to the said analysis matrix in that each of the said storage elements in the array is represented by a binary bit which is correspondingly positioned in the matrix, read-out means responsive to a second timing signal to analyze the permutational condition of the storage elements in each of the $m$ rows, each row being analyzed for a different one of said group of words in accordance with the said analysis matrix, whereby a read-out is effected if the word contained in a row of said array matches the correspondingly positioned word in the analysis matrix and storage is thereby terminated, the said group of words being arranged in said analysis matrix so that at least one of the bits of the last word in the matrix is repeated in at least the preceding word in the same column thereby forming at least one repetitive series, reset means responsive to a third timing signal keyed to the storage element which corresponds to the bit in the matrix which precedes the repetitive series, said reset means being rendered operative by the presence in the storage element of a bit of opposite sense to that of the repetitive series and acting to eliminate from said array the word in the row which contains the keying storage element, the storage elements corresponding to the bits in the said repetitive series being omitted from said array whereby the total number of storage elements in said array equals the product of $m$ times $n$ minus the number of bits in said repetitive series.

5. A device which stores a group of $m$ words, introduced therein in a binary code of $n$ bits, for different periods of time which vary in accordance with the identity of the word being stored comprising a plurality of binary storage elements in a form of bistable multivibrators arranged in an array of $n$ columns formed of $m$ rows, means for introducing in an ordered manner a different one of the $n$ bits of a word of said group into the first storage element of each of said $n$ columns, whereby the word is represented by the permutational condition of the first row of said $m$ rows of storage elements, a transfer gate connected to each of the binary storage elements in the array other than those in the last row and responsive to a first timing signal, the transfer gates being operative to transfer the bits from one storage element to the next succeeding storage element in a column whereby the word represented by the bits is transferred from row to row, an analysis matrix consisting of columnar arrangement of the said group of words in binary coded form, the said array of storage elements being related to the said analysis matrix in that each of the said storage elements in the array is represented by a binary bit which is correspondingly positioned in the matrix, $m$ "and" gates respectively connected to the storage elements in each of the $m$ rows in the said array and responsive to said second timing signal whereby the permutational condition of the storage elements in each of the rows is analyzed for a different one of said group of words in accordance with said analysis matrix, a read-out being effected and storage being terminated if the word contained in a row of said array matches the correspondingly positioned word in the analysis matrix, the said group of words being arranged in said analysis matrix so that at least one of the bits of the last word in the matrix is repeated in at least the preceding word in the same column thereby forming at least one repetitive series, reset means connected to a keying storage element and responsive to a third timing signal, said keying storage element being the one in the said array which corresponds to the bit in the matrix which precedes the said repetitive series, said reset means being rendered operative by the presence in the said keying storage element of a bit of opposite sense to that of the said repetitive series, said reset means acting to convert each of the storage elements in the row containing the said keying storage element to a sense which is the same as that of said repetitive series, the storage elements corresponding to the bits in the said repetitive series being omitted from the said array whereby the total number of storage elements in the said array equals the product of $m$ times the $n$, minus the number of bits in the said repetitive series.

6. The device of claim 5 in which said reset means is an "or" gate connected to the input of the said keying storage element.

References Cited by the Examiner

UNITED STATES PATENTS

| | | | |
|---|---|---|---|
| 1,376,556 | 1/21 | Lasker | 209—110 |

| | | | |
|---|---|---|---|
| 1,656,999 | 1/28 | Bull | 209—110 |
| 2,454,628 | 11/48 | Braun | 209—110 |
| 2,735,082 | 2/56 | Goldberg | 340—147 |
| 2,889,538 | 6/59 | Geisler | 340—173 |
| 2,907,011 | 9/59 | Kuder | 340—172.5 |
| 2,911,624 | 11/59 | Booth | 340—174 |

MALCOLM A. MORRISON, *Primary Examiner.*

CLAUDE A. LEROY, *Examiner.*

UNITED STATES PATENT OFFICE
CERTIFICATE OF CORRECTION

Patent No. 3,197,737

July 27, 1965

Joseph Patrick Conklin

It is hereby certified that error appears in the above numbered patent requiring correction and that the said Letters Patent should read as corrected below.

Column 1, line 24, for "2,977,144" read -- 2,977,114 --; column 11, line 52, for "key" read -- keying --; column 12, line 32, for "a" read -- the --; line 45, before "columnar" insert -- a --; line 54, for "said" read -- a --; line 56, before "said" insert -- the --.

Signed and sealed this 18th day of January 1966.

SEAL)
.ttest:

RNEST W. SWIDER
ttesting Officer

EDWARD J. BRENNER
Commissioner of Patents